(12) United States Patent
Gilton et al.

(10) Patent No.: US 12,244,941 B2
(45) Date of Patent: Mar. 4, 2025

(54) MULTISPECTRAL IMAGING

(71) Applicant: Calumino Pty Ltd., Eveleigh (AU)

(72) Inventors: Terry L. Gilton, Boise, ID (US); Mark Halstead, Auckland (NZ)

(73) Assignee: Calumino Pty Ltd., Eveleigh (AU)

(*) Notice: Subject to any disclaimer, the term of this patent is extended or adjusted under 35 U.S.C. 154(b) by 131 days.

(21) Appl. No.: 18/066,961

(22) Filed: Dec. 15, 2022

(65) Prior Publication Data

US 2024/0205554 A1    Jun. 20, 2024

(51) Int. Cl.
*G01N 33/00* (2006.01)
*G02B 27/10* (2006.01)
*H04N 25/10* (2023.01)

(52) U.S. Cl.
CPC ......... *H04N 25/10* (2023.01); *G02B 27/1013* (2013.01)

(58) Field of Classification Search
None
See application file for complete search history.

(56) References Cited

U.S. PATENT DOCUMENTS

2015/0377711 A1* 12/2015 Steffanson ............... G01J 5/40
250/349

* cited by examiner

*Primary Examiner* — Edemio Navas, Jr.
(74) *Attorney, Agent, or Firm* — Greenberg Traurig

(57) ABSTRACT

A multispectral imaging device having: multiple lens systems to form images of a scene respectively in separate wavelength ranges of electromagnetic radiations; an optical image sensor; multiple micro mirror arrays to measure the images of the scene respectively; an optical sub-system to direct visible light beams at micro mirror arrays to generate, on multiple sections of the optical image sensor, multiple visible light patterns respectively; and a processor connected to the optical image sensor to receive, from each of sections, data representative of a respective pattern. The processor can analyze the data determine angles of rotations of micro mirrors in the micro mirror arrays, and generate image data representative of the images of the scene respectively. The device can further include a visible light lens system to form a visible light image of the scene directly on a further section of the optical image sensor.

20 Claims, 9 Drawing Sheets

Form, via a visible light lens system of a device, a visible light image of a scene on a first section of an optical image sensing pixel array of the device 301

Form, via a first lens system of the device and on a radiation absorption side of a first micro mirror array having first micro mirrors, a first image of first radiation of the scene in a first spectrum outside of an image sensing range of the optical image sensing pixel array 303

Direct, via an optical sub-system of the device, a first visible light beam at a mirror side of the first micro mirror array to generate a first visible light pattern on a second section, separate from the first section, of the optical image pixel array 305

Receive, in a processor connected to the optical image sensing pixel array, an output generated by image sensing pixels of the optical image sensing pixel array in response to visible light incident on the image sensing pixels, the output including first data generated by the first section of the optical image sensing pixel array and representative of the visible light image of the scene, and second data generated by the second section of the optical image sensing pixel array and representative of the first visible light pattern generated by the first micro mirror array responsive to the first image of the first radiation of the scene in the first spectrum 307

Analyze, by the processor, the second data to determine angles of rotations of the first micro mirrors in the first micro mirror array 309

Generate, by the processor based on the angles of rotations, third data representative of the first image of the first radiation of the scene in the first spectrum measured via the first micro mirror array 311

FIG. 8

MULTISPECTRAL IMAGING

TECHNICAL FIELD

At least some embodiments disclosed herein relate to techniques of imaging in general, and more particularly but not limited to, techniques of imaging in multiple ranges of wavelengths of electromagnetic radiation.

BACKGROUND

U.S. Pat. No. 9,810,581, issued Nov. 7, 2017 and entitled "Micromechanical Device for Electromagnetic Radiation Sensing," discloses a micromechanical pixel configured for the sensing of thermal radiation intensity through the rotation of the micromechanical pixel in response to thermal radiation absorbed in the micromechanical pixel, the entire disclosure of which is incorporated herein by reference.

U.S. Pat. No. 9,851,256, issued Dec. 26, 2017 and entitled "Apparatus and Method for Electromagnetic Radiation Sensing," discloses a thermal radiation sensing apparatus having an optical system configured to measure the rotations of an array of micro mirrors, the entire disclosure of which is incorporated herein by reference.

U.S. Pat. No. 10,801,896, issued Oct. 13, 2020 and entitled "Sequential Beam Splitting in a Radiation Sensing Apparatus," discloses an optical system having multiple beam splitters configured for the measurement of the rotations of an array of micro mirrors, the entire disclosure of which is incorporated herein by reference.

U.S. Pat. No. 11,335,174, issued May 17, 2022 and entitled "Security Cameras With Thermal Imaging Sensors," discloses a security video camera controlled via a thermal imaging sensor and a passive infrared sensor, the entire disclosure of which is incorporated herein by reference.

U.S. Pat. App. Pub. No. 2021/0014396, published Jan. 14, 2021 and entitled "Hybrid Cameras", discloses a combination of an optical camera and infrared camera in a single device having a single output, the entire disclosure of which is incorporated herein by reference.

BRIEF DESCRIPTION OF THE DRAWINGS

The embodiments are illustrated by way of example and not limitation in the figures of the accompanying drawings in which like references indicate similar elements.

FIG. 8 shows a method of multispectral imaging according to one embodiment.

DETAILED DESCRIPTION

Figure 1:
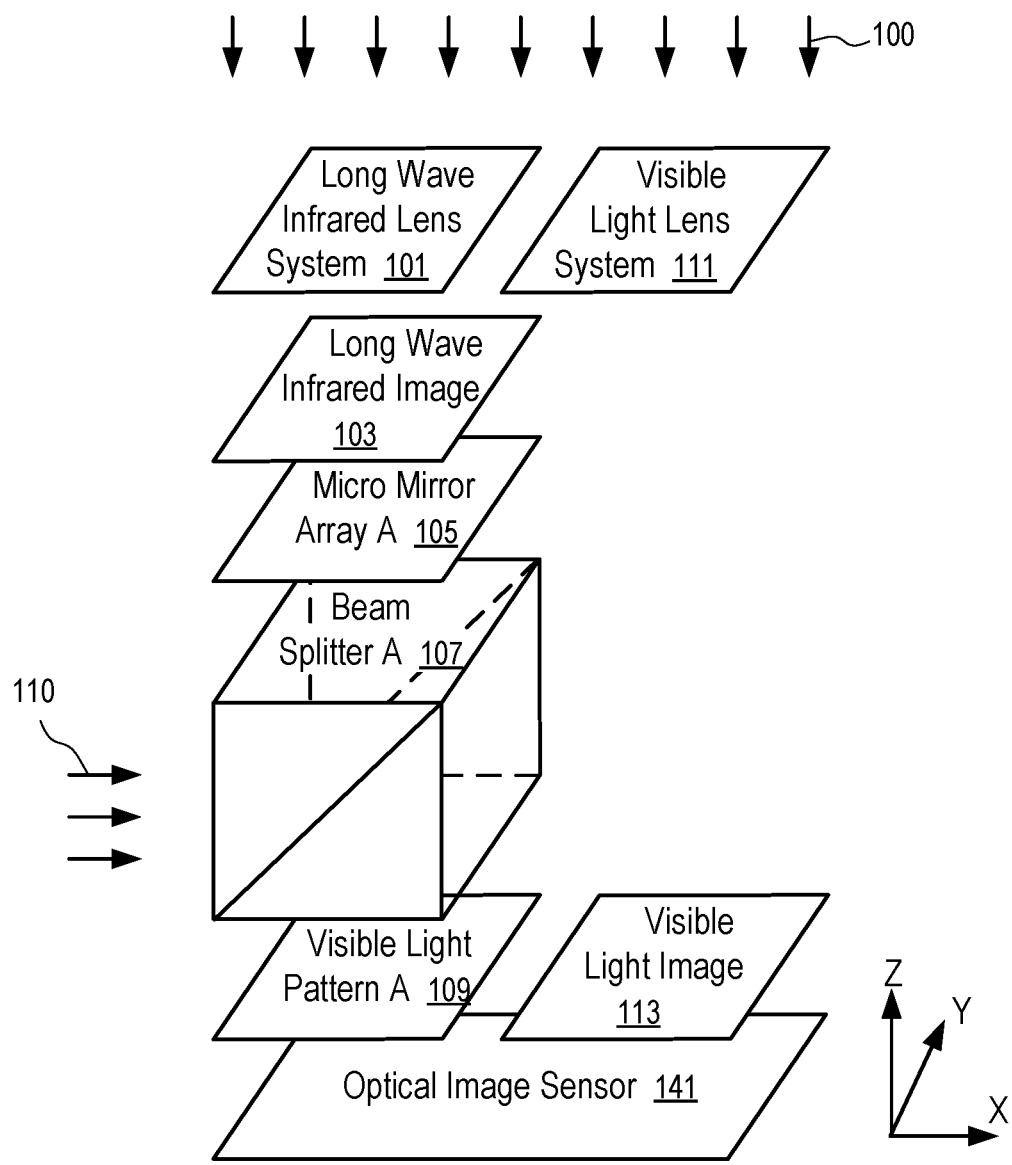
FIG. 1 shows a multispectral imaging device configured to image simultaneously in long wave infrared and visible light according to one embodiment.

At least some embodiments disclosed herein provide techniques to image a scene simultaneously in multiple ranges of wavelengths of electromagnetic radiation, such as long wave infrared, mid wave infrared, near infrared, and visible light. The timing of capturing images in different ranges of wavelengths can be aligned via the operation of a same optical image sensor configured to capture images in visible light.

A micro mirror configured as an imaging pixel can convert the intensity of thermal radiation incident on its radiation absorption surface into an angle of rotation of the micro mirror. An optical system can be configured to use an optical image sensor to measure the rotation through imaging the position change of a visible light spot reflected off the micro mirror. The intensity of thermal radiation on the radiation absorption surface can be calculated from the rotation measured using the optical system.

For example, an optical image sensor configured based on a complementary metal-oxide-semiconductor (CMOS) technique or a charge-coupled device (CCD) technique can be used in the optical system to detect the position of the visible light spot reflected off the micro mirror.

An array of micro mirrors can be used to measure a distribution of the intensity of thermal radiation, representative of a thermal image, incident on the plane of the radiation absorption surfaces of the micro mirrors. The angle of rotation of each micro mirror in the array can be used to compute a value of a pixel in a thermal image. Thus, the output of the measurements made via the micro mirror array can have a resolution equal to the resolution of the micro mirror array. The image sensing pixel array in the optical image sensor typically has a resolution much higher than the resolution of the micro mirror array for accurate analyses of the pattern of light spots reflected off the micro mirrors in determination of the rotations of the micro mirrors.

Although the optical image sensor is incapable of capturing, with adequate accuracy, images of electromagnetic radiation in ranges invisible to human eyes, such as images in long wave infrared, mid wave infrared, near infrared, the optical image sensor is capable of capturing images in visible light at a resolution higher than the resolution of micro mirror array.

At least some embodiments disclosed herein use the optical image sensor to capture both the visible light pattern reflected off the micro mirror array, from which data representative of a thermal image of a scene can be determined, and a visible light image of the same scene.

For example, the visible light pattern reflected off the micro mirror array can be arranged on one section of the optical image sensor, and the visible light image can be arranged on another section of the optical image sensor. When the optical image sensor generates an output, the output includes one array of pixel values representative of the visible light pattern and another array of pixel values representative of the visible light image of the scene. From an analysis of the array of pixel values representative of the visible light pattern, an array of pixel values representative of the thermal image of the scene, as measured on the radiation absorption surfaces of the micro mirror array, can be obtained. The array of pixel values representative of the thermal image of the scene and the array of pixel values representative of the optical image of the same scene can be in perfect alignment in time and space, with resolutions corresponding to the resolution of the micro mirror array and the resolution of the optical image sensor respectively.

Optionally, multiple sections of micro mirrors can be used to measure images of invisible radiations in different ranges, such as an image of long wave infrared radiation (e.g., having a wavelength at or near 14 micrometers), an image of mid wave infrared radiation (e.g., having a wavelength at or near 5 micrometers), an image of near infrared radiation (e.g., having a wavelength at or near 900 nanometers), etc.

For example, different lens systems can be configured to form images of different wavelength ranges on different micro mirror arrays. Each of the micro mirror arrays reflects a visible light pattern on a separate section of the optical image sensor. Thus, when the optical image sensor captures an image, the image includes a separate array of pixel values representative of the visible light pattern reflected off each of the micro mirror arrays, and the array of pixel values representative of the optical image of the scene. From the separate array of pixel values representative of the visible light pattern reflected off each of the micro mirror arrays, an array of pixel values of a corresponding image measured by the corresponding micro mirror array in the corresponding radiation spectrum (e.g., long wave infrared, mid wave infrared, near infrared) can be obtained with perfect alignment, in time and space, with the optical image.

FIG. 1 shows a multispectral imaging device configured to image simultaneously in long wave infrared and visible light according to one embodiment.

The multispectral imaging device of FIG. 1 has an optical image sensor 141, a visible light lens system 111, a long wave infrared lens system 101, and a micro mirror array 105.

The optical image sensor 141 can have an array of image sensing pixels that are uniformly arranged in rows and columns. Each image sensing pixel can generate a value (or a set of values) based on the intensity of visible light (or components of visible light) incident on the pixel. Thus, upon activation, the array of image sensing pixels can generate an array of pixel values representative of an entire image of visible light (including the visible light image 113 generated by a visible light lens system 111, and a visible light pattern 109 generated by micro mirrors in the array 105 reflecting a light beam 110) incident on the array of image sensing pixels of the optical image sensor 141. For example, the optical image sensor 141 can be implemented using a complementary metal-oxide-semiconductor (CMOS) technique or a charge-coupled device (CCD) technique.

The incoming radiation 100 from a scene to be imaged by the multispectral imaging device of FIG. 1 can include radiation components from multiple ranges of wavelengths of electromagnetic radiation, such as visible light (visible to human eyes), long wave infrared (e.g., having wavelengths approximately 14 micrometers), mid wave infrared radiation (e.g., having wavelengths approximately 5 micrometers), near infrared radiation (e.g., having wavelengths approximately 900 nanometers), etc.

The visible light lens system 111 can be used to direct visible light from the incoming radiation 100 to form a visible light image 113 on a section of the array of image sensing pixels of the optical image sensor 141. For example, the visible light lens system 111 can include an optical lens arranged at a position such that the section of the surface of the array of image sensing pixels of the optical image sensor 141 is at or near a focal point of the optical lens (or a pinhole to form the visible light image 113). Optionally, the visible light lens system 111 can include one or more filters configured to prevent some components of electromagnetic radiation from reaching the optical image sensor 141 as part of the visible light image 113. In some implementations, the optical image sensor 141 is insensitive to some components of electromagnetic radiation (e.g., long wave infrared, mid wave infrared, or near infrared, or a combination of such radiations); and thus, it is not necessary to configure the visible light lens system 111 to filter out such components.

Another section of the image sensing pixels of the optical image sensor 141 is configured in combination with a micro mirror array 105 to measure a long wave infrared image 103 resulting from the incoming radiation 100 of the scene. This section of the image sensing pixels of the optical image sensor 141 is configured as part of a sub-system of optical readout of the rotations of micro mirrors in the array 105.

The micro mirror array 105 has a radiation absorption side facing the incoming radiation 100 and a mirror side facing the optical image sensor. Radiation absorption surfaces of the micro mirrors in the array 105 form a surface on the radiation absorption side facing the incoming radiation 100; and the mirror portions of the micro mirrors in the array 105 can reflect a portion of a visible light beam 110 from a light source of the multispectral imaging device towards the optical image sensor 141 to form a visible light pattern 109.

Each micro mirror in the array 105 is exposed to a particular area of long wave infrared radiation within the image 103 and thus measures the average intensity within the particular area. When the micro mirror is charged up in energy from the thermal radiation in the area, the temperature of the micro mirror reaches an equilibrium, which causes the micro mirror to have a stable angle of rotation that can be measured using a sub-system of optical readout to compute the average intensity of thermal radiation in the area. In FIG. 1, the light beam 110 from the light source of the multispectral imaging device, a beam splitter 107, and a portion of the optical image sensor 141 are configured to form such a sub-system of optical readout.

Figure 7:
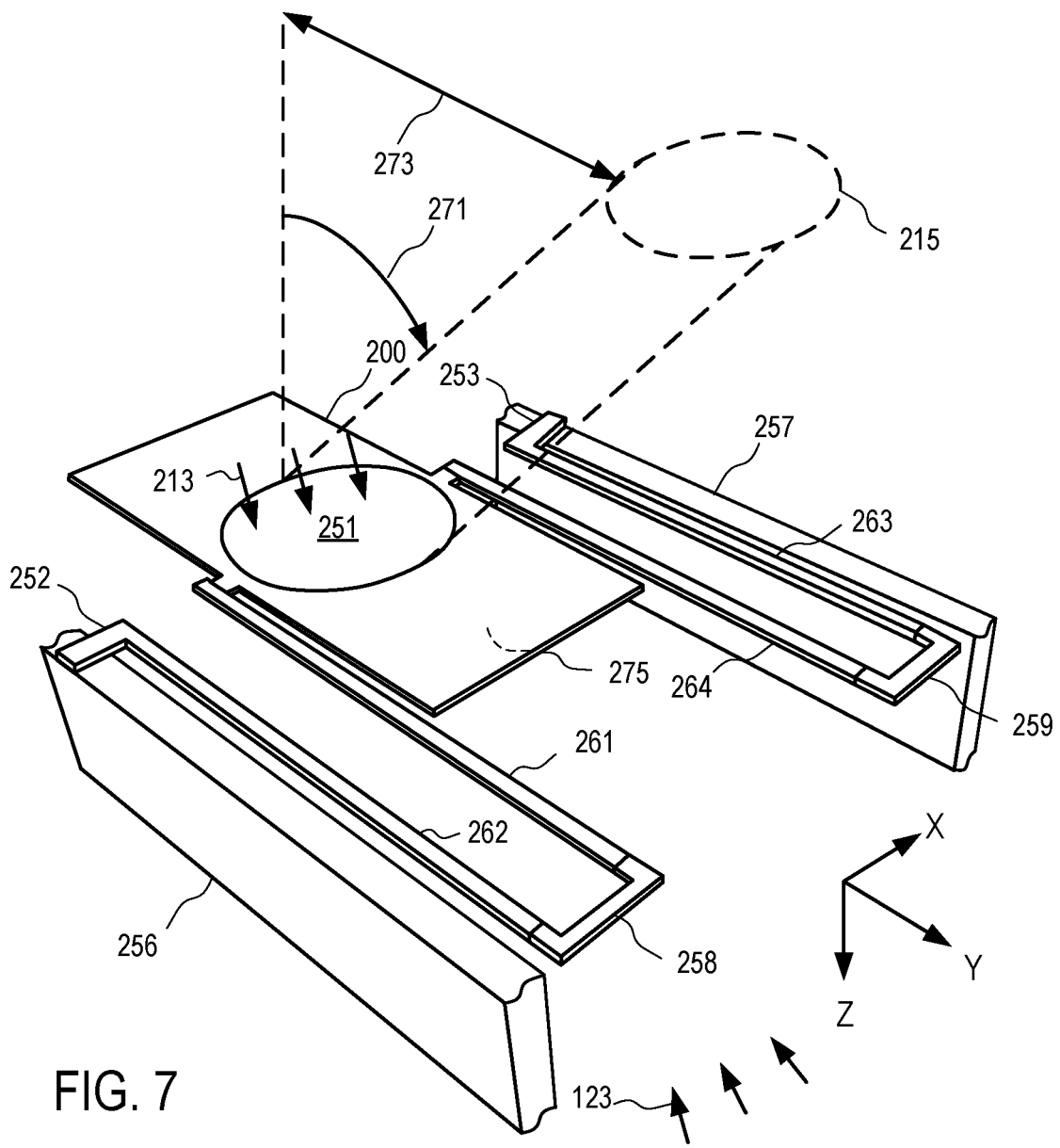
FIG. 7 shows a micro mirror operable in a multispectral imaging device according to one embodiment.

For example, each micro mirror in the array 105 can be configured in a way as illustrated in FIG. 7 to convert the intensity of long wave infrared radiation incident on the radiation absorption surface of the micro mirror as an angle of rotation of the micro mirror. Micro mirrors and sub-systems of optical readout of alternative designs can also be used.

The long wave infrared lens system 101 can be used to direct long wave infrared radiation from the incoming radiation 100 to form the long wave infrared image 103 on the radiation absorption side of the micro mirror array 105. The long wave infrared radiation absorbed by the micro mirror array 105 can rotate the micro mirrors in the array 105 to change the visible light pattern 109 resulting from the micro mirrors reflecting the visible light beam 110.

The beam splitter 107 is configured between the mirror side of the micro mirror array 105 and the optical image sensor 141. A portion of the visible light beam 110 from the light source (e.g., a light emitting diode (LED) device) of the multispectral imaging device is reflected partially by the beam splitter 107 towards the mirror side of the micro mirror array 105 and then further reflected by the micro mirrors in the array 105 towards the optical image sensor 141. The beam splitter 107 allows a portion of the light beam 110 reflected by the micro mirrors to partially go through and reach a section of the optical image sensor 141 as the visible light pattern 109.

When the optical image sensor 141 captures an image, the image includes a section of the visible light image 113 of the scene, and a section of the visible light pattern 109. A processing device can be used to analyze the data representative of the visible light pattern 109 to determine the rotations of the micro mirrors in the array 105. Since each micro mirror in the array 105 measures the intensity of an area in the long wave infrared image 103, the analysis result of the data representative of the visible light pattern 109 provides data representative of the long wave infrared image 103 at the resolution of the micro mirror array 105. The resolution of the data representative of the visible light image 113 is the same as the resolution of the section of image sensing pixels used in the optical image sensor 141 to capture the visible light image 113, which is typically higher than the resolution of the micro mirror array 105. By using the same optical image sensor 141 to capture both the visible light image 113 and the visible light pattern 109, data representative of the long wave infrared image 103 of the scene and data representative of the visible light image 113 of the scene can have perfect alignment in space and time.

The long wave infrared lens system 101 can include a long wave infrared lens arranged at a position such that the radiation absorption side of the micro mirror array 105 is at or near a focal point of the long wave infrared lens. Optionally, the long wave infrared lens system 101 can include one or more filters configured to prevent some components of electromagnetic radiation from reaching the radiation absorption side of the micro mirror array 105 as part of the long wave infrared image 103. For example, the long wave infrared lens system 101 can be configured to filter out visible light, mid wave infrared radiation, near infrared radiation, etc. Optionally, or in combination, the radiation absorption surfaces of the micro mirrors in the array 105 can be configured with material that is absorptive of long wave infrared but insensitive to or non-absorptive of other radiation components (e.g., visible light, mid wave infrared, near infrared). The combination of the filtering characteristics of the long wave infrared lens system 101 and the radiation absorption characteristics of the micro mirrors in the array 105 can be configured to measure the long wave infrared component from the incoming radiation 100.

FIG. 1 illustrates an example of using the long wave infrared lens system 101 and the micro mirror array 105 to capture a long wave infrared image 103. Alternatively, the combination of the long wave infrared lens system 101 and the micro mirror array 105 can be replaced with a corresponding combination to capture a mid wave infrared image (e.g., as in a portion of FIG. 2), or a corresponding combination to capture a near infrared image (e.g., as in another portion of FIG. 2).

FIG. 1 illustrates an example in which the light beam 110 of the sub-system of readout is configured to go into the beam splitter 107 in the direction of the X-axis. Alternatively, the beam splitter 107 can be oriented to reflect the light beam 110 going in the Y-axis (or the negative Y-axis). Optionally, the light beam 110 can be configured in the direction of the negative X-axis going through the light paths from the visible light lens system 111 to the visible light image 113 on the optical image sensor 141. The multispectral imaging device can include light barriers to shield the light beam 110 from reaching the visible light image 113 on the optical image sensor 141 via the beam splitter 107 (or through other paths).

Figure 2:
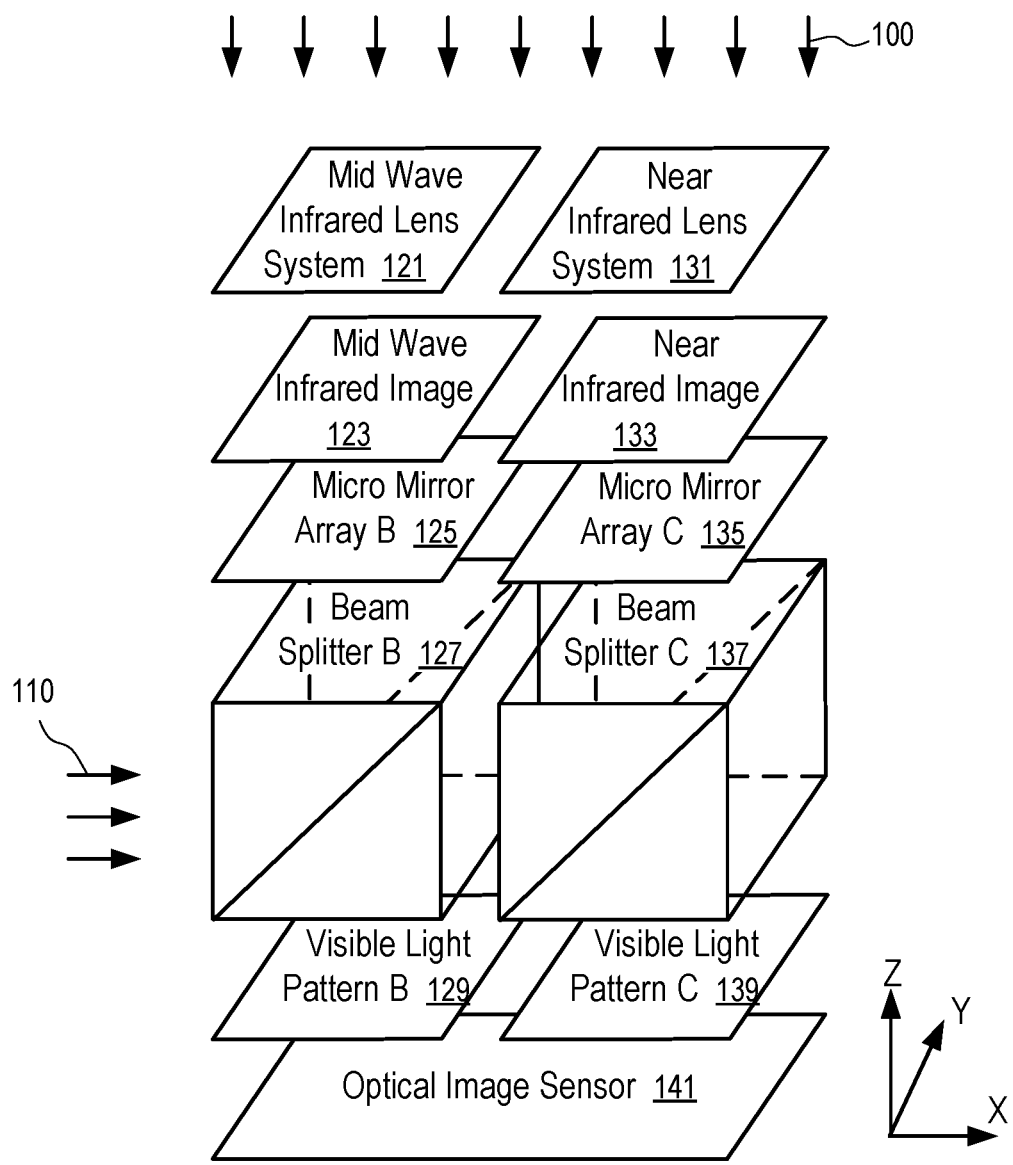
FIG. 2 shows a multispectral imaging device configured to image simultaneously in mid wave infrared and near infrared according to one embodiment.

FIG. 2 shows a multispectral imaging device configured to image simultaneously in mid wave infrared and near infrared according to one embodiment.

Similar to the use of a long wave infrared lens system 101 and a micro mirror array 105 in FIG. 1 to generate a visible light pattern 109 representative of rotations of micro mirrors in the array 105 responsive to a long wave infrared image 103, the multispectral imaging device of FIG. 2 uses a mid wave infrared lens system 121 and a micro mirror array 125 to generate a visible light pattern 129 representative of rotations of micro mirrors in the array 125 responsive to a mid wave infrared image 123.

Similarly, the multispectral imaging device of FIG. 2 uses a near infrared lens system 131 and a micro mirror array 135 to generate a visible light pattern 139 representative of rotations of micro mirrors in the array 135 responsive to a near infrared image 133.

When the optical image sensor 141 captures an image, the image includes a section of the visible light pattern 139 of the near infrared radiation of the scene, and a section of the visible light pattern 129 of the mid wave infrared radiation of the scene. A processing device can be used to analyze the data representative of the visible light pattern 129 to determine the rotations of the micro mirrors in the array 125 and thus data representative of the mid wave infrared image 123 at a resolution corresponding to the resolution of the micro mirror array 125. Similarly, an analysis of the data representative of the visible light pattern 139 provides the rotations of the micro mirrors in the array 135 and thus data representative of the near infrared image 133 at a resolution corresponding to the resolution of the micro mirror array 135. By using the same optical image sensor 141 to capture both the visible light pattern 129 and the visible light pattern 139, data representative of the mid wave infrared image 123 of the scene and data representative of the near infrared image 133 of the scene can have perfect alignment in space and time.

In FIG. 2, a portion of light beam 110 from the light source of the multispectral imaging device can go through the beam splitter 127 and enter the beam splitter 137. The beam splitter 137 can partially reflect the portion the light beam 110 entering the beam splitter 137 towards the mirror side of the micro mirror array 135 for further reflection by the micro mirrors in the array 135 towards the optical image sensor 141 to form the visible light pattern 139 in a way similar to the formation of the visible light pattern 129. Thus, it is not necessary to configure a separate light source for each of the visible light patterns.

Figure 3A:
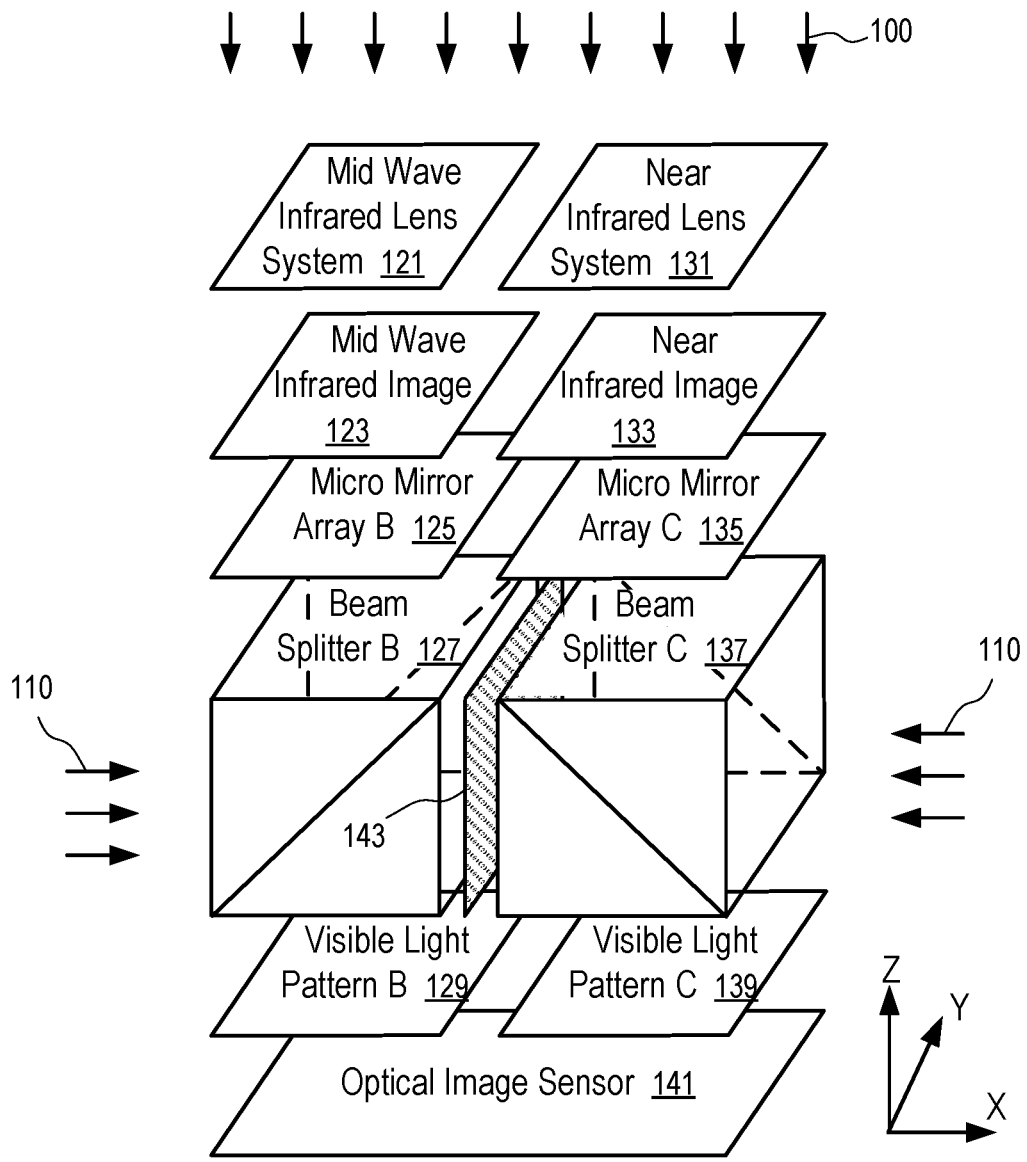
FIG. 3A shows another multispectral imaging device configured to image simultaneously in mid wave infrared and near infrared according to one embodiment.

Alternatively, separate light sources can be used as illustrated in FIG. 3A.

FIG. 3A shows another multispectral imaging device configured to image simultaneously in mid wave infrared and near infrared according to one embodiment.

In FIG. 3A, separate light sources (e.g., light emitting diode (LED) devices) are used to generate a light beam 110 for the beam splitters 127 and 137 respectively. A light barrier 143 is configured between the beam splitters 127 and 137. The beam splitter 127 receives the light beam 110 coming in the direction of the X-axis and is configured to reflect a portion of the light beam 110 toward the mirror side of the micro mirror array 125. The beam splitter 137 receives the light beam 110 coming in the direction of the negative X-axis and is configured to reflect a portion of the light beam 110 toward the mirror side of the micro mirror array 135.

Alternatively, a light source (e.g., light emitting diode (LED) device) can be used to provide light in the direction of the Y-axis (or negative Y-axis); and the beam splitters 127 and 137 can have a same orientation to reflect their respectively received portions of the light beam 110 towards the micro mirror arrays 125 and 135.

Figure 3B:
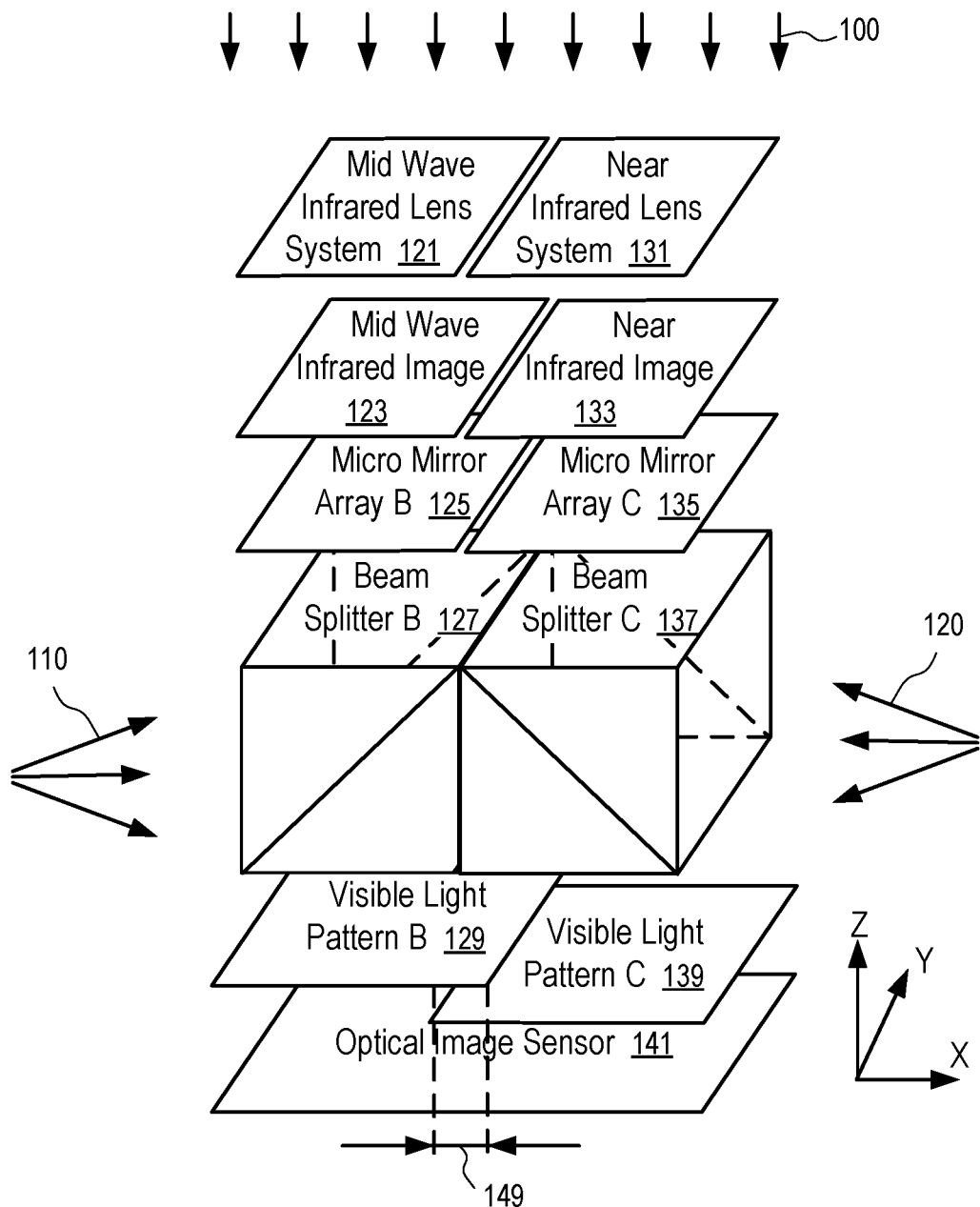
FIG. 3B shows another multispectral imaging device configured to image simultaneously in mid wave infrared and near infrared according to one embodiment.

FIG. 3B shows another multispectral imaging device configured to image simultaneously in mid wave infrared and near infrared according to one embodiment.

In FIG. 3B, separate light sources (e.g., light emitting diode (LED) devices) are used to generate a light beam 110 for the beam splitter 127 and a light beam 120 for the beam splitter 137 respectively. The light beams 110 and 120 can be divergent, directional light beams with different characteristics (e.g., having different colors, intensities, phases, spatial off-sets, sizes, and/or shapes, etc.). No light barrier is configured between the beam splitters 127 and 137. The beam splitter 127 receives the light beam 110 coming in the direction of the X-axis and is configured to reflect a portion of the light beam 110 toward the mirror side of the micro mirror array 125 to form a visible light pattern 129. The beam splitter 137 receives the light beam 120 coming in the direction of the negative X-axis and is configured to reflect a portion of the light beam 110 toward the mirror side of the micro mirror array 135 to form a visible light pattern 139. The visible light patterns 129 and 139 can have an overlapping region 149 on the optical image sensor 141. Since the visible light patterns 129 and 139 are from the light beams 110 and 120 of different characteristics (e.g., having different colors, intensities, phases, spatial off-sets, sizes, and/or shapes, etc.), the image data generated from the optical image sensor can be filtered to recover the separate visible light patterns 129 and 139 respectively.

In some implementations, the micro mirror arrays 125 and 135 are configured in a same chip of micro mirrors. A portion of the micro mirrors in the chip is used as the micro mirror array 125; and another portion of the micro mirrors in the chip is used as the micro mirror array 135.

Optionally, multiple beam splitters can be arranged to process the light beam 110 sequentially (e.g., similar to the sequential processing of the light beam 110 by the beam splitters 127 and 137 in FIG. 2) for each of the micro mirror arrays 105, 125, and 135 in FIG. 1, FIG. 2, FIG. 3A and FIG. 3B to reduce the height of the multispectral imaging device. Further details and examples of techniques to use sequential beam splitters to reduce the height of a thermal imaging device having a sub-system of optical readout can be found in U.S. Pat. No. 10,801,896, issued Oct. 13, 2020 and entitled "Sequential Beam Splitting in a Radiation Sensing Apparatus," the entire disclosures of which are incorporated herein by reference.

The mid wave infrared lens system 121 can be used to direct mid wave infrared radiation from the incoming radiation 100 to form the mid wave infrared image 123 on the radiation absorption side of the micro mirror array 125. The mid wave infrared radiation absorbed by the micro mirror array 125 can rotate the micro mirrors in the array 125 to change the visible light pattern 129 resulting from the micro mirrors reflecting visible light beam 110. The mid wave infrared lens system 121 can include a mid wave infrared lens arranged at a position such that the radiation absorption side of the micro mirror array 125 is at or near a focal point of the mid wave infrared lens. Optionally, the mid wave infrared lens system 121 can include one or more filters configured to prevent some components of electromagnetic radiation from reaching the radiation absorption side of the micro mirror array 125 as part of the mid wave infrared image 123. For example, the mid wave infrared lens system 121 can be configured to filter out visible light, long wave infrared radiation, near infrared radiation, etc. Optionally, or in combination, the radiation absorption surfaces of the micro mirrors in the array 125 can be configured with material that is absorptive of mid wave infrared but insensitive to or non-absorptive of other radiation components (e.g., visible light, long wave infrared, near infrared). The combination of the filtering characteristics of the mid wave infrared lens system 121 and the radiation absorption characteristics of the micro mirrors in the array 125 can be configured to measure the mid wave infrared component from the incoming radiation 100.

Similarly, the near infrared lens system 131 can be used to direct near infrared radiation from the incoming radiation 100 to form the near infrared image 133 on the radiation absorption side of the micro mirror array 135. The near infrared radiation absorbed by the micro mirror array 135 can rotate the micro mirrors in the array 135 to change the visible light pattern 139 resulting from the micro mirrors reflecting visible light beam 110. The near infrared lens system 131 can include a near infrared lens arranged at a position such that the radiation absorption side of the micro mirror array 135 is at or near a focal point of the near infrared lens. Optionally, the near infrared lens system 131 can include one or more filters configured to prevent some components of electromagnetic radiation from reaching the radiation absorption side of the micro mirror array 135 as part of the near infrared image 133. For example, the near infrared lens system 131 can be configured to filter out visible light, long wave infrared radiation, mid wave infrared radiation, etc. Optionally, or in combination, the radiation absorption surfaces of the micro mirrors in the array 135 can be configured with material that is absorptive of near infrared but insensitive to or non-absorptive of other radiation components (e.g., visible light, long wave infrared, mid wave infrared). The combination of the filtering characteristics of the near infrared lens system 131 and the radiation absorption characteristics of the micro mirrors in the array 135 can be configured to measure the near infrared component from the incoming radiation 100.

Optionally, the mid wave infrared lens system 121 and the micro mirror array 125 in FIG. 2 (or FIG. 3A or FIG. 3B) can be replaced with the long wave infrared lens system 101 and the micro mirror array 105 in FIG. 1 to capture a long wave infrared image 103 of the scene.

Optionally, the near infrared lens system 131 and the micro mirror array 135 in FIG. 2 (or FIG. 3A or FIG. 3B) can be replaced with the long wave infrared lens system 101 and the micro mirror array 105 in FIG. 1 to capture a long wave infrared image 103 of the scene.

Figure 4:
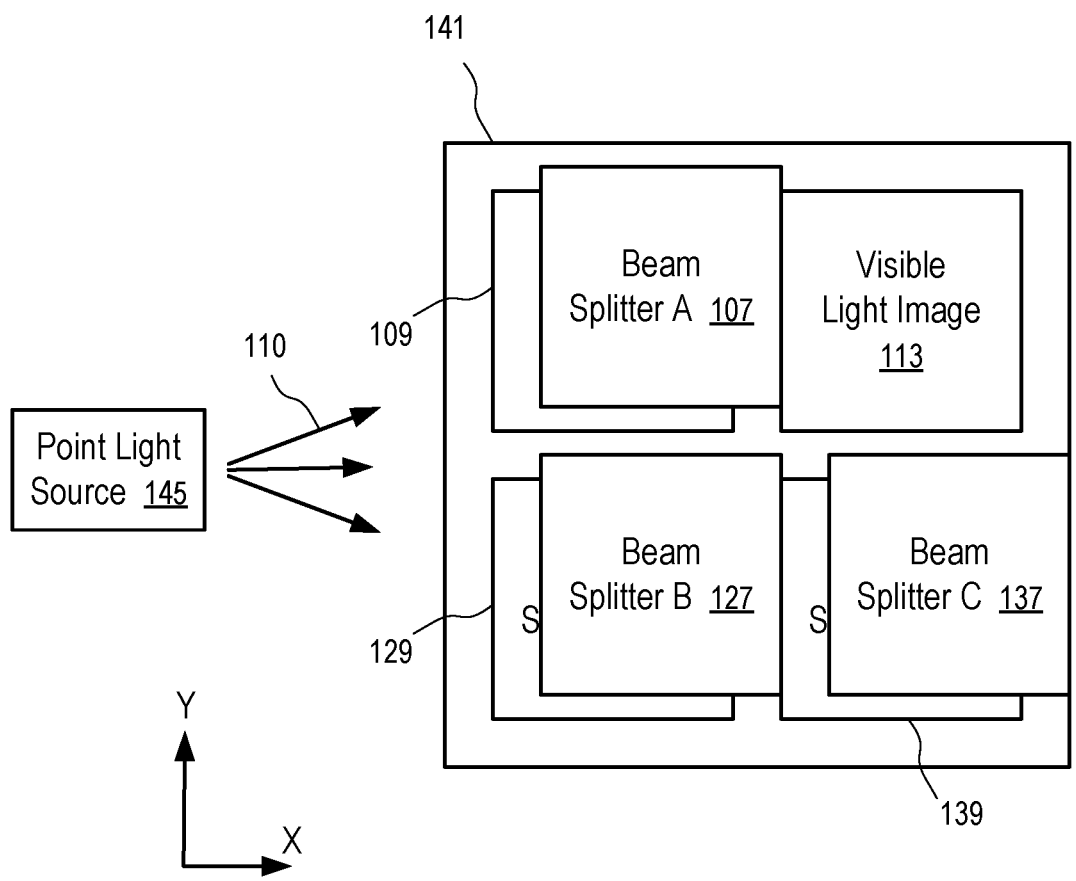
FIG. 4 shows a portion of a multispectral imaging device configured to image simultaneously in long wave infrared, mid wave infrared, near infrared, and visible light according to one embodiment.

Optionally, the techniques of FIG. 2 (or FIG. 3A or FIG. 3B) can be combined with the techniques of FIG. 1 to measure a visible light image 113, a visible light pattern 109 representative of a long wave infrared image 103, a visible light pattern 129 representative of a mid wave infrared image 123, and a visible light pattern 139 representative of a near infrared image 133 using an optical image sensor 141 at the same time, as illustrated in FIG. 4.

FIG. 4 shows a portion of a multispectral imaging device configured to image simultaneously in long wave infrared, mid wave infrared, near infrared, and visible light according to one embodiment.

In FIG. 4, an optical image sensor 141 is configured with four sections of image sensing pixels for capturing a visible light image 113, a visible light pattern 109 representative of a long wave infrared image 103, a visible light pattern 129 representative of a mid wave infrared image 123, and a visible light pattern 139 representative of a near infrared image 133.

The visible light image 113 and the visible light pattern 109 representative of a long wave infrared image 103 can be generated in a way as in FIG. 1; and the visible light pattern 129 representative of a mid wave infrared image 123, and the visible light pattern 139 representative of a near infrared image 133 can be generated in a way as illustrated in FIG. 2, FIG. 3A and FIG. 3B.

FIG. 4 illustrates an example where the visible light beam 110 of the sub-system of optical readout of micro mirror rotations is generated by a point light source 145 (e.g., implemented using a light emitting diode (LED) device). The light beam 110 from the light source 145 is arranged for parallel processing/splitting by beam splitters 107 and 127 and for sequential processing/splitting by the beam splitter 127 and then by the beam splitter 137.

Alternatively, the light beam 110 from the light source 145 can be configured to go in the direction of the negative Y-axis for parallel processing/splitting by beam splitters 107 and 137 and for sequential processing/splitting by the beam splitter 107 and then by the beam splitter 127 (with corresponding adjustments in the orientations of the beam splitters).

Alternatively, the light beam 110 from the light source 145 can be configured to go in the direction of the Y-axis for parallel processing/splitting by beam splitters 127 and 137 and for sequential processing/splitting by the beam splitter 127 and then by the beam splitter 107 (with corresponding adjustments in the orientations of the beam splitters).

Alternatively, the light beam 110 from the light source 145 can be configured to go in the direction of the negative X-axis for parallel processing/splitting by beam splitters 107 and 137 and for sequential processing/splitting by the beam splitter 137 and then by the beam splitter 127 (with corresponding adjustments in the orientations of the beam splitters).

In some implementations, the visible light pattern 109 representative of a long wave infrared image 103, the visible light pattern 129 representative of a mid wave infrared image 123, and the visible light pattern 139 representative of a near infrared image 133 are configured in a row (or a column) on the optical image sensor 141. Thus, the beam splitters 107, 127, and 137 are also positioned in a row (or column) to process the light beam 110 in parallel (or sequentially).

In general, the multispectral imaging device can be configured to image in some of the wavelength ranges (e.g., visible light, near infrared, mid wave infrared, long wave infrared). Optionally, the multispectral imaging device can be configured to image in more wavelength ranges.

Optionally, an optical lens can be configured between the point light source 145 and the beam splitters 107, 127, and 137 to generate a parallel, collimated light beam 110 for processing by the beam splitters 107, 127, and 137. Alternatively, such an optical lens can be omitted to provide a divergent, directional light beam 110 for processing by the beam splitters 107, 127, and 137.

Figure 5:
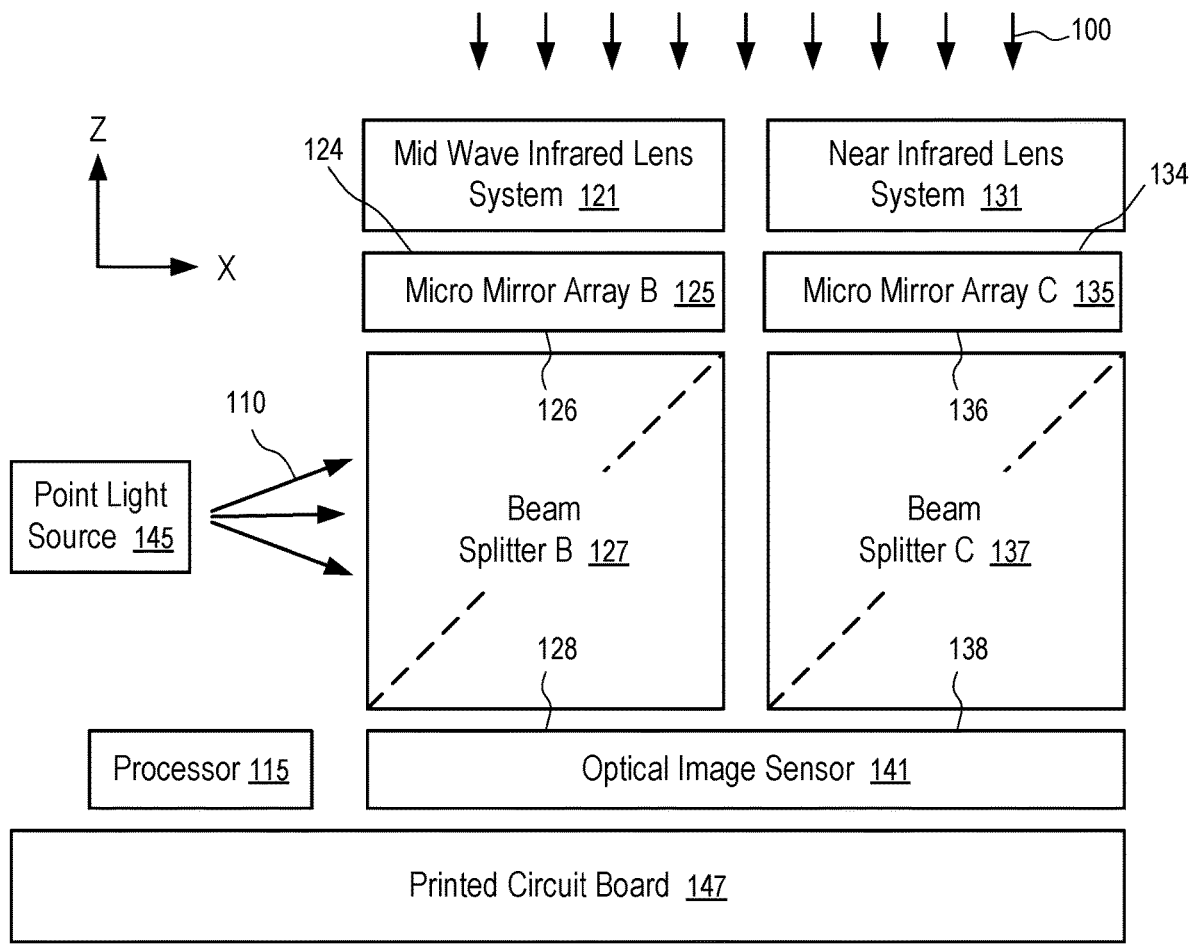
FIG. 5 shows a multispectral imaging device configured to image simultaneously in at least mid wave infrared and near infrared according to one embodiment.

FIG. 5 shows a multispectral imaging device configured to image simultaneously in at least mid wave infrared and near infrared according to one embodiment.

For example, the multispectral imaging device of FIG. 2 can be implemented in a way as illustrated in FIG. 5.

In FIG. 5, a point light source 145 (e.g., a light emitting diode (LED) device) is configured to provide the visible light beam 110, which enters the beam splitter 127 placed under the micro mirror array 125 and is partially reflected towards the mirror side 126 of the micro mirror array 125 and is partially allowed to go through the beam splitter 127 to enter the beam splitter 137 that is placed under the micro mirror array 135.

The micro mirrors in the array 125 reflect, towards the section 128 of the optical image sensor 141, the portion of the light beam 110, directed by the beam splitter 127 towards the mirror side 126 of the array 125. The beam splitter 127 allows a portion of the light beam 110 reflected by the micro mirrors in the array 125 to go through and form the visible light pattern 129 on the section 128 of the optical image sensor 141. A processor 115 connected via a printed circuit board 147 to the optical image sensor 141 can analyze the visible light pattern 129 captured by the section 128 of the optical image sensor 141 to determine the angles of rotations of the micro mirrors in the array 125 and thus the radiation intensity of the mid wave infrared image 123 formed by the mid wave infrared lens system 121 on the radiation absorption side 124 of the micro mirror array 125.

Similarly, the micro mirrors in the array 135 reflect, towards the section 138 of the optical image sensor 141, a portion of the light beam 110 directed by the beam splitter 137 towards the mirror side 136 of the array 135. The beam splitter 137 allows a portion of the light beam 110 reflected by the micro mirrors in the array 135 to go through and form the visible light pattern 139 on the section 138 of the optical image sensor 141. The processor 115 connected via the printed circuit board 147 to the optical image sensor 141 can analyze the visible light pattern 139 captured by the section 138 of the optical image sensor 141 to determine the angles of rotations of the micro mirrors in the array 135 and thus the radiation intensity of the near infrared image 133 formed by the near infrared lens system 131 on the radiation absorption side 134 of the micro mirror array 135.

Optionally, a single beam splitter can replace the beam splitters 127 and 137 to reflect the light beam 110 from the point light source 145 to the mirror sides 126 and 136 of the micro mirror arrays 125 and 135. However, such an arrangement can increase the height of the multispectral imaging device, since the single beam splitter has a height that is twice or more the height of the beam splitter 127 (or 137).

Optionally, to further reduce the height of the multispectral imaging device, each of the beam splitters 127 and 137 can be replaced with two or more beam splitters to sequentially process the light beam 110 from the point light source 145 for different sections of each of the micro mirror arrays 125 and 135, in a way the beam splitters 127 and 137 sequentially processing the light beam 110 for the micro mirror arrays 125 and 135.

Optionally, an optical lens can be placed between the point light source 145 and the beam splitter 127 such that the point light source 145 is at or near a focal point of the optical lens. The optical lens converts the divergent, directional light beam 110 into parallel, collimated light beam 110 for further processing by the beam splitters 127 and 137.

Optionally, the micro mirror arrays 125 and 135 can be formed on a same chip of micro mirrors. Different sections of the micro mirrors of the chip can be used to measure the radiation intensity of the mid wave infrared image 123 and the near infrared image 133 formed on the respective sections of the radiation absorption side (124 and 134) of the chip.

FIG. 5 illustrates an implementation where the light beam 110 from the point light source 145 is configured in the direction of the X-axis.

Alternatively, the light beam 110 from the point light source 145 can be configured in the direction of the Y-axis (or the negative Y-axis) to enter the beam splitters 127 and 137 in parallel; and the orientations of the beam splitters 127 and 137 can be changed to partially reflect the incoming light beam 110 towards the mirror sides 126 and 136. In such an embodiment, the beam splitters 127 and 137 can be combined as, or replaced with, a single beam splitter (with increased width) without increasing the height of the multispectral imaging device.

Alternatively, separately light sources (e.g., 145) can be used to provide separate light beams 110 for the beam splitters 127 and 137 as in FIG. 3A and FIG. 3B. A light barrier 143 can be configured between the beam splitters 127 and 137 to separate the light beams from the different sources (e.g., 145).

Optionally, the mid wave infrared lens system 121 (or the near infrared lens system 131) can be replaced with a long wave infrared lens system 101 of FIG. 1 to measure the radiation intensity of a long wave infrared image 103 formed on the radiation absorption side 124 (or 134) of the micro mirror array 125 (or 135).

Figure 6:
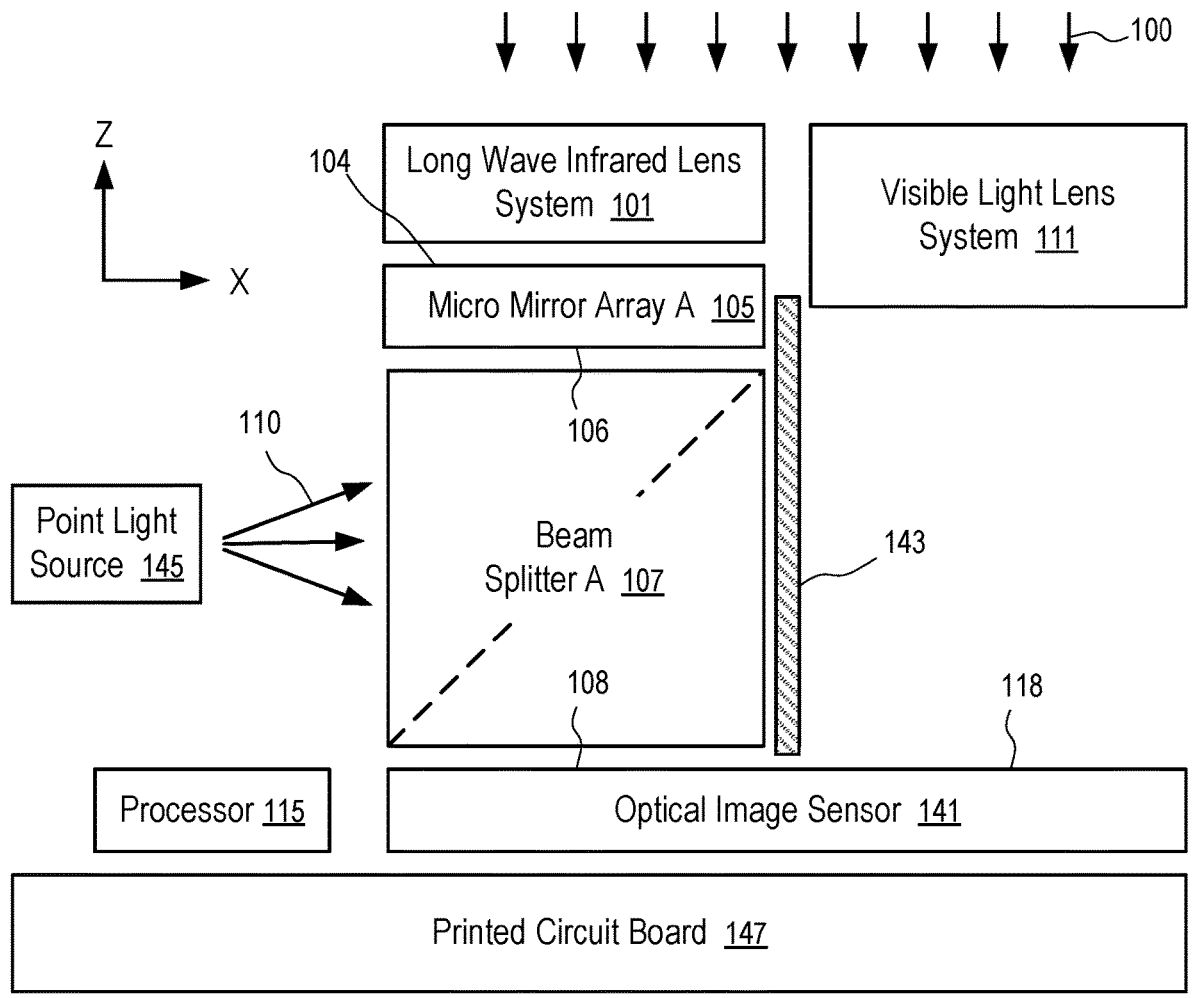
FIG. 6 shows a multispectral imaging device configured to image simultaneously in at least long wave infrared and visible light according to one embodiment.

FIG. 6 shows a multispectral imaging device configured to image simultaneously in at least long wave infrared and visible light according to one embodiment.

For example, the multispectral imaging device of FIG. 1 can be implemented in a way as illustrated in FIG. 6.

In FIG. 6, a point light source 145 (e.g., a light emitting diode (LED) device) is configured to provide the visible light beam 110, which enters the beam splitter 107 placed under the micro mirror array 105 and is partially reflected towards the mirror side 106 of the micro mirror array 105 and is partially allowed to go through the beam splitter 107. A light barrier 143 is configured to prevent any portion of the light beam 110 from reaching the section 118 of the optical image sensor 141 used to capture a visible light image 113 formed via the visible light lens system 111.

The micro mirrors in the array 105 reflect, towards the section 108 of the optical image sensor 141, a portion of the light beam 110 directed by the beam splitter 107 towards the mirror side 106 of the array 105. The beam splitter 107 allows a portion of the light beam 110 reflected by the micro mirrors in the array 105 to go through and form the visible light pattern 109 on the section 108 of the optical image sensor 141. A processor 115 connected via a printed circuit board 147 to the optical image sensor 141 can analyze the visible light pattern 109 captured by the section 108 of the optical image sensor 141 to determine the angles of rotations of the micro mirrors in the array 105 and thus the radiation intensity of the long wave infrared image 103 formed by the long wave infrared lens system 101 on the radiation absorption side 104 of the micro mirror array 105.

Optionally, the long wave infrared lens system 101 can be replaced with a mid wave infrared lens system 121 (or a near infrared lens system 131) of FIG. 2 to measure the radiation intensity of a mid wave infrared image 123 (or a near infrared image 133) formed on the radiation absorption side 104 of the micro mirror array 105.

FIG. 6 illustrates an implementation where the light beam 110 from the point light source 145 is configured in the direction of the X-axis.

Alternatively, the light beam 110 from the point light source 145 can be configured in the direction of the Y-axis (or the negative Y-axis, or the negative X-axis); and the orientation of the beam splitter 107 can be changed to partially reflect the incoming light beam 110 towards the mirror side 106. In such an embodiment, the light barrier 143 can be omitted or repositioned.

Optionally, an optical lens can be placed between the point light source 145 and the beam splitter 107 such that the point light source 145 is at or near a focal point of the optical lens. The optical lens converts the divergent, directional light beam 110 into parallel, collimated light beam 110 for further processing by the beam splitter 107.

Optionally, the multispectral imaging devices of FIG. 5 and FIG. 6 can be combined in a way as illustrated in FIG. 4 to form a multispectral imaging device that can capture a visible light image 113 of a scene, a long wave infrared image 103 of the scene, a mid wave infrared image 123 of the scene, and a near infrared image 133 of the scene at the same time using different sections of the optical image sensor 141.

Optionally, separate optical image sensors (e.g., 141) can be used to capture the visible light image 113 and the visible light patterns (e.g., 109, 129, 139) under the coordination by a processor (e.g., 115).

FIG. 7 shows a micro mirror operable in a multispectral imaging device according to one embodiment. For example, the micro mirrors in the arrays 105, 125 and 135 can be implemented as illustrated in FIG. 7.

In FIG. 7, the micro mirror has a plate portion 200 supported by joints 252 and 253 on portions 256 and 257 of a substrate, through a pair of bi-material inner arms 261 and 264 that are connected via two thermal isolation portions 258 and 259 to a pair of bi-material outer arms 262 and 263.

The arms (e.g., 261, 262, 263, 264) and the plate portion 200 can have a layer of heat conductive material (e.g., metal) to promote heat distribution within them and between the plate portion 200 and the inner arms 261 and 264. The thermal isolation portions 258 and 259 lack such a layer of heat conductive material (e.g., metal).

The plate portion 200 having an upper surface configured to face incoming radiation 100 and a lower surface configured to face incoming light beam 213 of optical light generated by a sub-system of optical readout, such as light beam 110 from a point light source 145.

The lower surface of the plate portion 200 has a light reflection portion 251 configured as a mirror to reflect the incoming light beam 213 to generate a light spot 215 in the sub-system of optical readout. The rotation 271 of the plate portion 200 along an axis (e.g., X-axis) can be measured via the travel distance 273 of the light spot 215 (e.g., along Y-axis). An optical image sensor in the sub-system of optical readout (e.g., optical image sensor 141) can be used to measure the travel distance (e.g., as in FIG. 5).

The upper surface of the plate portion 200 has a thermal radiation absorption material to form a radiation absorption surface 275. Energy absorbed in the upper surface can change the temperature of the plate portion 200 and thus temperature of the bi-material inner arms 261 and 264, causing the inner arms 261 and 264 to bend and thus rotate the plate portion 200.

The micro mirror has similar outer bi-material arms 262 and 263 that are attached to portions 256 and 257 of the substrate. When the environment temperate causes bending in the arms 261, 262, 263 and 264, the same amounts of bending caused by the environment change cancel of the corresponding rotation to the plate portion 200.

The thermal isolation portions 258 and 259 can prevent heat from transferring from the plate portion via the inner arms 261 and 264 to the outer arms 262 and 263. Thus, the temperature differences between the inner arms 261 and 264 and the outer arms 262 and 263 drive the rotation of the plate portion 200 in accordance with the thermal radiation intensity on the upper surface of the plate portion 200.

Further examples and details of micro mirrors can be found in U.S. Pat. No. 9,810,581, issued Nov. 7, 2017 and entitled "Micromechanical Device for Electromagnetic Radiation Sensing," the entire disclosure of which is incorporated herein by reference.

FIG. 8 shows a method of multispectral imaging according to one embodiment.

For example, the method of FIG. 8 can be implemented in a multispectral imaging device in FIG. 1 to FIG. 6 with micro mirrors configured in a way as illustrated in FIG. 7.

For example, the multispectral imaging device can have a plurality of lens systems (e.g., 101, 111, 121, 131) to generate a plurality of images (e.g., 103, 113, 123, 133) of a same scene (e.g., having the incoming radiation 100) respectively in different wavelength ranges of electromagnetic radiations, such as a spectrum of visible light, a spectrum of near infrared, a spectrum of mid wave infrared, a spectrum of long wave infrared, etc. The multispectral imaging device can have an array of optical image sensing pixels (e.g., configured to generate outputs using a complementary metal-oxide-semiconductor (CMOS) technique or a charge-coupled device (CCD) technique). The optical image sensing pixels can be operable to generate image data in response to visible light incident on the image sensing pixels but can be insufficiently sensitive to electromagnetic radiations in other wavelength ranges (e.g., from 900 nanometers to 14 micrometers). Thus, the optical image sensing pixels are not used to directly capture the images (e.g., 103, 123, 133) outside of the wavelength ranges of visible light. One or more arrays (e.g., 105, 125, 135) of micro mirrors can be used to absorb the electromagnetic radiations in the images (e.g., 103, 123, 133) if wavelengths outside of the sensing range of the array of optical image sensing pixels to convert the radiation intensities in the images (e.g., 103, 123, 133) into angles of rotations of micro mirrors in the arrays (e.g., 105, 125, 135). An optical sub-system is configured to direct visible light beams onto mirror portions of the micro mirrors in the arrays (e.g., 105, 125, 135) to generate visible light patterns (e.g., 109, 129, 139) on sections (e.g., 108, 128, 138) of the array of optical image sensing pixels (e.g., in optical image sensor 141). Thus, the optical image sensing pixels (e.g., in optical image sensor 141) can simultaneously capture the visible light patterns (e.g., 109, 129, 139) and the visible light image 113 of the scene using the different sections (e.g., 108, 128, 138, 118) of the optical image sensing pixels (e.g., in optical image sensor 141). A processor 115 connected to the optical image sensing pixels (e.g., in optical image sensor 141) can analyze each of the visible light patterns (e.g., 109, 129, 139) to determine angles of rotations (e.g., 271) of micro mirrors (e.g., constructed as in FIG. 7) in the arrays (e.g., 105, 125, 135) to generate image data representative of the images (e.g., 103, 123, 133) of the scene in different wavelength ranges of electromagnetic radiations that are outside of the sensing range of the optical image sensing pixels (e.g., optical image sensor 141). The array of optical image sensing pixels can be configured on a same chip of image sensing pixels (e.g., optical image sensor 141). Alternatively, multiple optical image sensors (e.g., 141) can be controlled by the processor 115 to capture data simultaneously.

At block 301, a visible light lens system 111 of a multispectral imaging device forms a visible light image 113 of a scene (e.g., having incoming radiation 100) on a first section (e.g., 118) of an optical image sensing pixel array (e.g., optical image sensor 141) of the device.

At block 303, a first lens system (e.g., 101, 121, or 131) of the device forms, on a radiation absorption side (e.g., 104, 124, or 134) of a first micro mirror array (e.g., 105, 125, or 135) having first micro mirrors (e.g., configured as in FIG. 7), a first image (e.g., 103, 123, or 133) of first radiation of the scene in a first spectrum outside of an image sensing range of the optical image sensing pixel array.

At block 305, an optical sub-system of the device directs a first visible light beam at a mirror side (e.g., 106, 126, or 136) of the first micro mirror array (e.g., 105, 125, or 135) to generate a first visible light pattern (e.g., 109, 129, or 139) on a second section (e.g., 108, 128, or 138), separate from the first section (e.g., 118), of the optical image pixel array (e.g., optical image sensor 141).

For example, the optical sub-system can include a point light source 145 (e.g., implemented using a light emitting diode (LED) device) and a first beam splitter (e.g., 107, 127, or 137) configured between a mirror side (e.g., 106, 126, or 136) of the first micro mirror array (e.g., 105, 125, or 135) and a respective section (e.g., 108, 128, 138) of the optical image sensing pixel array (e.g., optical image sensor 141). A visible light beam (e.g., 110) from the point light source 145 can enter the first beam splitter (e.g., 107, 127, or 137) and be split into: a third visible light beam going through the first beam splitter (e.g., 107, 127, or 137); and the first visible light beam reflected towards the mirror side (e.g., 106, 126, or 136) of the micro mirror array (e.g., 105, 125, or 135) to generate a respective light pattern (e.g., 109, 129, or 139) on the respective section (e.g., 108, 128, or 138) of the optical image sensing pixel array (e.g., optical image sensor 141).

For example, the multispectral imaging device can further include: a second micro mirror array (e.g., 125, 135, or 105) having second micro mirrors; and a second lens system (e.g., 121, 131, or 101) configured to form, on a radiation absorption side (e.g., 124, 134, or 104) of the second micro mirror array (e.g., 125, 135, or 105), a second image (e.g., 123, 133, or 103) of second radiation of the scene in a second spectrum, separate from the first spectrum and outside of an image sensing range of the optical image sensing pixel array (e.g., optical image sensor 141). The optical sub-system can be further configured to direct a second visible light beam at a mirror side (e.g., 126, 136, or 106) of the second micro mirror array (e.g., 125, 135, 105) to generate a second visible light pattern (e.g., 129, 139, 109) on a third section (e.g., 128, 138, or 108), separate from the first section (e.g., 118) and the second section (e.g., 108, 128, or 138), of the optical image pixel array (e.g., optical image sensor 141).

Optionally, the first micro mirror array (e.g., 105, 125, or 135) and the second micro mirror array (e.g., 125, 135, or 105) are configured in a same chip of micro mirrors.

For example, the optical sub-system can include a second beam splitter (e.g., 127, 137, or 107) configured between the mirror side (e.g., 126, 136, or 106) of the second micro mirror array (e.g., 125, 135, 105) and a respective section (e.g., 128, 138, or 108) of the optical image sensing pixel array (e.g., optical image sensor 141). A visible light beam (e.g., beam 110 directly from the point light source 145 or the third visible light beam going through the first beam splitter (e.g., 107, 127, or 137)) can enter the second beam splitter (e.g., 127, 137, or 107) and be split into a visible light beam going through the second beam splitter (e.g., 127, 137, or 107); and the second visible light beam reflected towards the mirror side (e.g., 126, 136, or 106) of the micro mirror array (e.g., 125, 135, or 105) to generate a respective light pattern (e.g., 129, 139, or 109) on the respective section (e.g., 128, 138, or 108) of the optical image sensing pixel array (e.g., optical image sensor 141).

At block 307, a processor 115 connected to the optical image sensing pixel array (e.g., optical image sensor 141) receives an output generated by image sensing pixels of the optical image sensing pixel array in response to visible light incident on the image sensing pixels. The output includes first data generated by the first section (e.g., 118) of the optical image sensing pixel array and representative of the visible light image (e.g., 113) of the scene. The output further includes second data generated by the second section (e.g., 108, 128, or 138) of the optical image sensing pixel array and representative of the first visible light pattern (e.g., 109, 129, or 139) generated by the first micro mirror array (e.g., 105, 125, 135) responsive to the first image (e.g., 103, 123, or 133) of the first radiation of the scene in the first spectrum.

For example, the output can further include fourth data generated by the third section (e.g., 128, 138, or 108) of the optical image sensing pixel array (e.g., optical image sensor 141) and representative of the second visible light pattern (e.g., 129, 139, or 109) generated by the second micro mirror array (e.g., 125, 135, 105) responsive to the second image (e.g., 123, 133, or 103) of the second radiation of the scene in the second spectrum.

For example, the first radiation of the scene in the first spectrum and the second radiation of the scene in the second spectrum can be in different ranges of long wave infrared, mid wave infrared, and near infrared.

At block 309, the processor 115 can analyze the second data to determine angles of rotations (e.g., 271) of the first micro mirrors (e.g., as in FIG. 7) in the first micro mirror array (e.g., 105, 125, or 135).

At block 311, the processor 115 can generate, based on the angles of rotations (e.g., 271), third data representative of the first image (e.g., 103, 123, or 133) of the first radiation of the scene in the first spectrum measured via the first micro mirror array (e.g., 105, 125, or 135).

Similarly, the processor 115 can analyze the fourth data to determine angles of rotations of the second micro mirrors in the second micro mirror array (e.g., 125, 135, or 105) and generate fifth data representative of the second image (e.g., 123, 133, or 103) of the second radiation of the scene in the second spectrum measured via the second micro mirror array (e.g., 125, 135, or 105).

Optionally, the visible light lens system 111 can be omitted; and the visible light image 113 of the scene having the incoming radiation 100 is not captured.

In one embodiment, a multispectral imaging device (e.g., configured as in FIG. 1 to FIG. 6) is configured in a computer system as an input device. Optionally, the computing resources of the computer system can be used to perform the computations in analyzing a visible light pattern (e.g., 109, 129, 139) reflected by a micro mirror array (e.g., 105, 125, 135) to generate data representative of an image (e.g., 103, 123, 133) measured by the micro mirror array (e.g., 105, 125, 135).

An example machine of a computer system within which a set of instructions, for causing the machine to perform any one or more of the methods discussed herein, can be executed. In some embodiments, the computer system can correspond to a host system that includes, is coupled to, or utilizes a memory sub-system or can be used to perform the operations described above. In alternative embodiments, the machine can be connected (e.g., networked) to other machines in a LAN, an intranet, an extranet, or the internet, or any combination thereof. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and within the processing device during execution thereof by the computer system, the main memory and the processing device also constituting machine-readable storage media. The machine-readable medium, data storage system, or main memory can correspond to the memory sub-system.

In one embodiment, the instructions include instructions to implement functionality corresponding to the operations described above. While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device, comprising:
    an optical image sensing pixel array having image sensing pixels configured to generate data in response to visible light incident on the image sensing pixels;
    a visible light lens system configured to form a visible light image of a scene on a first section of the optical image sensing pixel array;
    a first micro mirror array having first micro mirrors;
    a first lens system configured to form, on a radiation absorption side of the first micro mirror array, a first image of first radiation of the sensing scene in a first spectrum outside of an image sensing range of the optical image sensing pixel array;
    an optical sub-system configured to direct a visible light beam at a mirror side of the first micro mirror array to generate a first visible light pattern on a second section, separate from the first section, of the optical image sensing pixel array; and
    a processor connected to the optical image sensing pixel array to receive an output, including: first data generated by the first section of the optical image sensing pixel array and representative of the visible light image of the scene; and
    second data generated by the second section of the optical image sensing pixel array and representative of the first visible light pattern generated by the first micro mirror array responsive to the first image of the first radiation of the scene in the first spectrum;
    wherein the processor is further configured to analyze the second data to determine angles of rotations of the first micro mirrors in the first micro mirror array and generate third data representative of the first image of the first radiation of the scene in the first spectrum measured via the first micro mirror array.

2. The device of claim 1, wherein the first section of the optical image sensing pixel array and the second section of the optical image sensing pixel array are configured in a same chip of image sensing pixels.

3. The device of claim 2, wherein the optical image sensing pixel array is configured to generate the output via a complementary metal-oxide-semiconductor (CMOS) technique or a charge-coupled device (CCD) technique.

4. The device of claim 2, wherein the first radiation of the scene in the first spectrum is in a spectrum of long wave infrared, a spectrum of mid wave infrared, or a spectrum of near infrared.

5. The device of claim 2, further comprising:
    a second micro mirror array having second micro mirrors; and a second lens system configured to form, on a radiation absorption side of the second micro mirror array, a second image of second radiation of the scene in a second spectrum, separate from the first spectrum and outside of an image sensing range of the optical image sensing pixel array;

wherein the optical sub-system is further configured to direct a visible light beam at a mirror side of the second micro mirror array to generate a second visible light pattern on a third section, separate from the first section and the second section, of the optical image sensing pixel array; and wherein the output further includes fourth data generated by the third section of the optical image sensing pixel array and representative of the second visible light pattern generated by the second micro mirror array responsive to the second image of the second radiation of the scene in the second spectrum; and wherein the processor is further configured to analyze the fourth data to determine angles of rotations of the second micro mirrors in the second micro mirror array- and generate fifth data representative of the second image of the second radiation of the scene in the second spectrum measured via the second micro mirror array.

6. The device of claim 5, wherein the first radiation of the scene in the first spectrum and the second radiation of the scene in the second spectrum are in different ranges of long wave infrared, mid wave infrared, and near infrared.

7. The device of claim 6, wherein the optical sub-system includes:
a first beam splitter configured between the first micro mirror array and the second section of the optical image sensing pixel array; and
a second beam splitter configured between the second micro mirror array and the third section of the optical image sensing pixel array.

8. The device of claim 7, wherein the second beam splitter is configured to reflect a portion of a first visible light beam passing through the first beam splitter towards the mirror side of the second micro mirror array.

9. The device of claim 7, wherein the optical sub-system further includes:
a point light source configured to generate a first light beam;
wherein the first beam splitter and the second beam splitter are configured with a same orientation relative to the point light source to process the first light beam in parallel.

10. The device of claim 7, wherein the first micro mirror array and the second micro mirror array are configured in a same chip of micro mirrors.

11. A method, comprising:
forming, via a visible light lens system of a device, a visible light image of a scene on a first section of an optical image sensing pixel array of the device;
forming, via a first lens system of the device and on a radiation absorption side of a first micro mirror array having first micro mirrors, a first image of first radiation of the scene in a first spectrum outside of an image sensing range of the optical image sensing pixel array;
directing, via an optical sub-system of the device, a first visible light beam at a mirror side of the first micro mirror arrayto generate a first visible light pattern on a second section, separate from the first section, of the optical image sensing pixel array;
receiving, in a processor connected to the optical image sensing pixel array, an output generated by image sensing pixels of the optical image sensing pixel array in response to visible light incident on the image sensing pixels, the output including:
first data generated by the first section of the optical image sensing pixel array and representative of the visible light image of the scene; and
second data generated by the second section of the optical image sensing pixel array and representative of the first visible light pattern generated by the first micro mirror array responsive to the first image of the first radiation of the scene in the first spectrum;
analyzing, by the processor, the second data to determine angles of rotations of the first micro mirrors in the first micro mirror array; and
generating, by the processor based on the angles of rotations, third data representative of the first image of the first radiation of the scene in the first spectrum measured via the first micro mirror array.

12. The method of claim 11, wherein the first section of the optical image sensing pixel array and the second section of the optical image sensing pixel array are configured in a same chip of image sensing pixels; and the method further comprises:
generating, by the optical image sensing pixel array, the output using a complementary metal-oxide-semiconductor (CMOS) technique or a charge-coupled device (CCD) technique.

13. The method of claim 12, further comprising:
forming, via a second lens system of the device and on a radiation absorption side of the second micro mirror array having second micro mirrors, a second image of second radiation of the scene in a second spectrum, separate from the first spectrum and outside of an image sensing range of the optical image sensing pixel array;
directing, by the optical sub-system of the device, a second visible light beam at a mirror side of the second micro mirror arrayto generate a second visible light pattern on a third section, separate from the first section and the second section, of the optical image sensing pixel array, wherein the output further includes fourth data generated by the third section of the optical image sensing pixel array and representative of the second visible light pattern generated by the second micro mirror array responsive to the second image of the second radiation of the scene in the second spectrum;
analyzing, by the processor, the fourth data to determine angles of rotations of the second micro mirrors in the second micro mirror array; and
generating, by the processor, fifth data representative of the second image of the second radiation of the scene in the second spectrum measured via the second micro mirror array.

14. The method of claim 13, wherein the first radiation of the scene in the first spectrum and the second radiation of the scene in the second spectrum are in different ranges of long wave infrared, mid wave infrared, and near infrared.

15. The method of claim 14, further comprising:
splitting, by a first beam splitter of the optical sub-system configured between the first micro mirror array and the second section of the optical image sensing pixel array, an incoming visible light beam into:
the first visible light beam reflected to the mirror side of the first micro mirror array; and
a third visible light beam passing through the first beam splitter; and reflecting, by a second beam splitter of the optical sub-system configured between the second micro mirror array and the third section of the optical image sensing pixel array, a portion of the third visible light beam as the second visible light beam to the mirror side of the second micro mirror array.

16. The method of claim 15, further comprising:
generating, by a point light source of the optical sub-system, the incoming visible light beam.

17. The method of claim 16, wherein the first micro mirror array and the second micro mirror array are configured in a same chip of micro mirrors.

18. A device, comprising:
a plurality of lens systems configured to form a plurality of images of a scene respectively in a plurality of wavelength ranges of electromagnetic radiations;
an optical image sensing pixel array having image sensing pixels configured to generate data in response to visible light incident on the image sensing pixels;
a plurality of micro mirror arrays configured to measure the plurality of images of the scene respectively via absorption of radiation energy of the images to rotate micro mirrors in the plurality of micro mirror arrays;
an optical sub-system configured to direct visible light beams at the plurality of micro mirror arrays to generate, on a plurality of sections of the optical image sensing pixel array, a plurality of visible light patterns respectively;
a visible light lens system configured to form a visible light image on a further section of the optical image sensing pixel array without an array of micro mirrors configured between the visible light lens system and the further section of the optical image sensing pixel array; and
a processor connected to the optical image sensing pixel array to receive, from each of the plurality of sections of the optical image sensing pixel array, data representative of a respective pattern, among the plurality of visible light patterns;
wherein the processor is further configured to analyze the data representative of the respective pattern to determine angles of rotations of micro mirrors in a respective micro mirror array, among the plurality of micro mirror arrays, and generate image data representative of a respective image, among the plurality of images of the scene respectively in the plurality of wavelength ranges of electromagnetic radiations.

19. The device of claim 18,
wherein the optical sub-system comprises:
a point light source configured to generate a visible light beam; and
a plurality of beam splitters configured to direct a plurality of portions of the visible light beam towards mirror portions of the plurality of micro mirror arrays to generate the plurality of visible light patterns respectively on the plurality of sections of the optical image sensing pixel array.

20. The device of claim 18, wherein the visible light beams have different characteristics in color, intensity, phase, spatial off-set, size, or shape, or any combination thereof; and visible light patterns generated by the plurality of micro mirror arrays reflecting the visible light beams have at least one overlapping area on the optical image sensing pixel array.

\* \* \* \* \*